(12) United States Patent
Rubbright et al.

(10) Patent No.: US 6,175,105 B1
(45) Date of Patent: Jan. 16, 2001

(54) CONTAINER FOR MICROWAVE COOKING OF FOOD PRODUCTS CONTAINING LIQUIDS

(75) Inventors: Harry A. Rubbright, Mendota Heights; Nelson J. Beall, St. Michael, both of MN (US); Stephen A. Gaeta, Flemington; M. Debbie Meiners, Somerville, both of NJ (US)

(73) Assignee: Bestfoods, Englewood Cliffs, NJ (US)

(*) Notice: Under 35 U.S.C. 154(b), the term of this patent shall be extended for 0 days.

(21) Appl. No.: 09/165,080

(22) Filed: Oct. 2, 1998

(51) Int. Cl.[7] .................................................. H05B 6/80

(52) U.S. Cl. ...................... 219/725; 219/732; 219/762; 99/DIG. 14; 426/243

(58) Field of Search ................................... 219/725, 732, 219/734, 735, 762; 99/DIG. 14; 426/107, 241, 243, 234

(56) References Cited

U.S. PATENT DOCUMENTS

| | | |
|---|---|---|
| D. 192,485 | 3/1962 | Eicholtz . |
| D. 193,118 | 6/1962 | Bostrom . |
| D. 193,586 | 9/1962 | Eicholtz . |
| D. 204,212 | 3/1966 | Davis . |
| D. 231,085 | 4/1974 | Edwards . |
| D. 239,999 | 5/1976 | Christian . |
| D. 241,399 | 9/1976 | Christian . |
| D. 279,168 | 6/1985 | Goldsmith . |
| D. 310,464 | 9/1990 | Laib . |
| D. 323,097 | 1/1992 | Picozza . |
| D. 337,051 | 7/1993 | Harbeke . |
| 4,416,907 | 11/1983 | Watkins ................................. 426/234 |
| 4,560,850 | * 12/1985 | Levendusky et al. ................ 219/731 |
| 4,704,510 | * 11/1987 | Matsui ................................... 219/728 |
| 4,859,822 | * 8/1989 | Ragusa et al. ........................ 219/728 |
| 4,892,213 | * 1/1990 | Mason, Jr. ........................... 220/4.21 |
| 5,171,952 | 12/1992 | Waligorski, et al. ......... 219/10.55 E |
| 5,305,911 | 4/1994 | Aylward . |
| 5,315,083 | * 5/1994 | Green ................................... 219/734 |
| 5,393,543 | 2/1995 | Laufer . |
| 5,397,586 | 3/1995 | Furcsik . |
| 5,414,248 | 5/1995 | Phillips . |
| 5,416,304 | 5/1995 | De La Cruz et al. . |
| 5,416,305 | 5/1995 | Tambellini . |
| 5,423,453 | * 6/1995 | Fritz ...................................... 220/608 |
| 5,427,741 | 6/1995 | Bennett . |
| 5,451,418 | 9/1995 | Gusek . |

(List continued on next page.)

FOREIGN PATENT DOCUMENTS

| | | |
|---|---|---|
| 0 128 425 | 12/1984 | (EP) . |
| 2118918 | 11/1983 | (GB) . |
| 93/23971 | 11/1993 | (WO) . |

OTHER PUBLICATIONS

European Research Search Report No. EP 99 10 8581.

*Primary Examiner*—Philip H. Leung
(74) *Attorney, Agent, or Firm*—Norris, McLaughlin & Marcus

(57) ABSTRACT

A container for microwave cooking having geometric features which improve the efficiency and uniformity of microwave cooking of food products containing liquids and which enhance boiling uniformity while preventing boilover of the contents. The container has a bottom portion and a side panel wherein the bottom portion contains a central segment in the shape of a section of a sphere. The side panel is tapered outwardly as it extends from the bottom portion to an end opening. Sharp corners are avoided within the container. As the result of the geometry of the container, a more uniform distribution of heat within the contents of the container is attained during cooking and the combination of uniform heating, the lack of sharp corners and the tapered side panel causes boiling of the contents without bumping, thereby minimizing the risk of boil over.

16 Claims, 4 Drawing Sheets

U.S. PATENT DOCUMENTS

| | | |
|---|---|---|
| 5,460,839 | 10/1995 | Archibald . |
| 5,483,044 | 1/1996 | Thorneywork et al. . |
| 5,491,323 | 2/1996 | Mori et al. . |
| 5,510,132 | 4/1996 | Gallo, Jr. . |
| 5,519,195 | 5/1996 | Keefer et al. . |
| 5,527,413 | 6/1996 | Perry et al. . |
| 5,539,187 | 7/1996 | Smith et al. . |
| 5,541,390 | 7/1996 | Pinceloup . |
| 5,548,101 | 8/1996 | Lee . |
| 5,582,854 | 12/1996 | Nosaka et al. . |
| 5,588,587 | 12/1996 | Stier et al. . |
| 5,589,093 | 12/1996 | Chen . |
| 5,593,610 | 1/1997 | Minerich et al. . |

\* cited by examiner

CONTAINER FOR MICROWAVE COOKING OF FOOD PRODUCTS CONTAINING LIQUIDS

BACKGROUND OF THE INVENTION

1. Field of the Invention

The present invention has to do with a container that provides improved cooking properties in a microwave oven. More specifically, the invention relates to a bowl having geometric features which improve the efficiency and uniformity of microwave cooking of food products containing liquids and which enhance boiling uniformity while preventing boil over of the contents.

2. The Prior Art

Microwave cooking is frequently associated with uneven heating and boiling over of liquid contents. One of the ways of minimizing these problems is to cook for a brief time, stir, cook again, stir again, and so forth until the cooking is complete. Consumer preference, however, is to cook the product once and remove it from the microwave oven in a condition that is ready to eat.

The present invention overcomes the problems associated with the prior art by providing a combination of geometric features which enhance the efficiency and uniformity of microwave cooking by taking into account the dielectric properties of the liquid-containing food products being cooked and the geometry of the container in relation to the microwave wavelength. The design also causes the liquid contents to cook with boiling while preventing boil over.

SUMMARY OF THE INVENTION

The container of the invention is in the form of a bowl having a bottom portion and a side panel and the bowl is dimensioned to preclude the establishment of a resonance phenomena (standing wave), which would result in an unpredictable microwave heating, by having a base in the shape of a torus with a diameter large enough to minimize or preclude internal resonance in a liquid-containing food. The diameter also is small enough to permit effective microwave cooking of the contents.

The bottom portion of the bowl comprises a central segment and an outer segment with the central segment being in the form of a push-up in the shape of a section of a sphere. The push-up extends to a bottom panel along a first bottom radius and the bottom panel extends to the side panel along one or more than one additional bottom radii (i.e., at least a second bottom radius). Accordingly, the outer segment is comprised of the first bottom radius, the bottom panel and one or more than one additional bottom radii. In one embodiment, the first bottom radius and the one additional bottom radius (i.e., the second bottom radius) are the same and the radius extends continuously from the push-up to the side panel forming a curved bottom panel.

The side panel of the bowl is tapered outwardly from the bottom as it extends toward an opening at the top of the bowl and a rim is provided at the top in the form of a flange with a rolled outer edge to provide a surface for adhering a lid and to add structural strength.

Externally at the bottom of the bowl a bottom rib is optionally provided to raise the bowl slightly off the shelf of the microwave oven so that heat loss from the bowl to the shelf of the oven is minimized.

The bowl can be disposable or reusable and is produced by conventional processing techniques for molding of any suitable plastic material, for example, injection molding, thermoforming and the like.

DETAILED DESCRIPTION OF THE INVENTION

The container of the invention is for microwave cooking of products containing liquid, especially water. Examples of suitable products include dehydrated and rehydratable foods such as soups, sauces, pasta and cereals wherein water is added before cooking.

Figure 1:
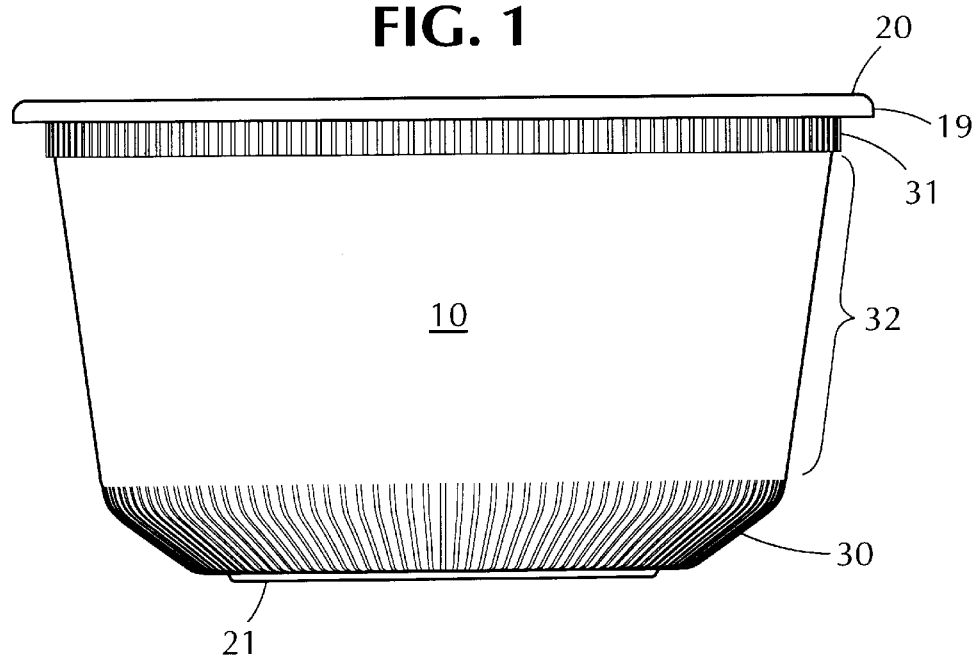
FIG. 1 is a side elevational view of the bowl of the invention.
Figure 2:
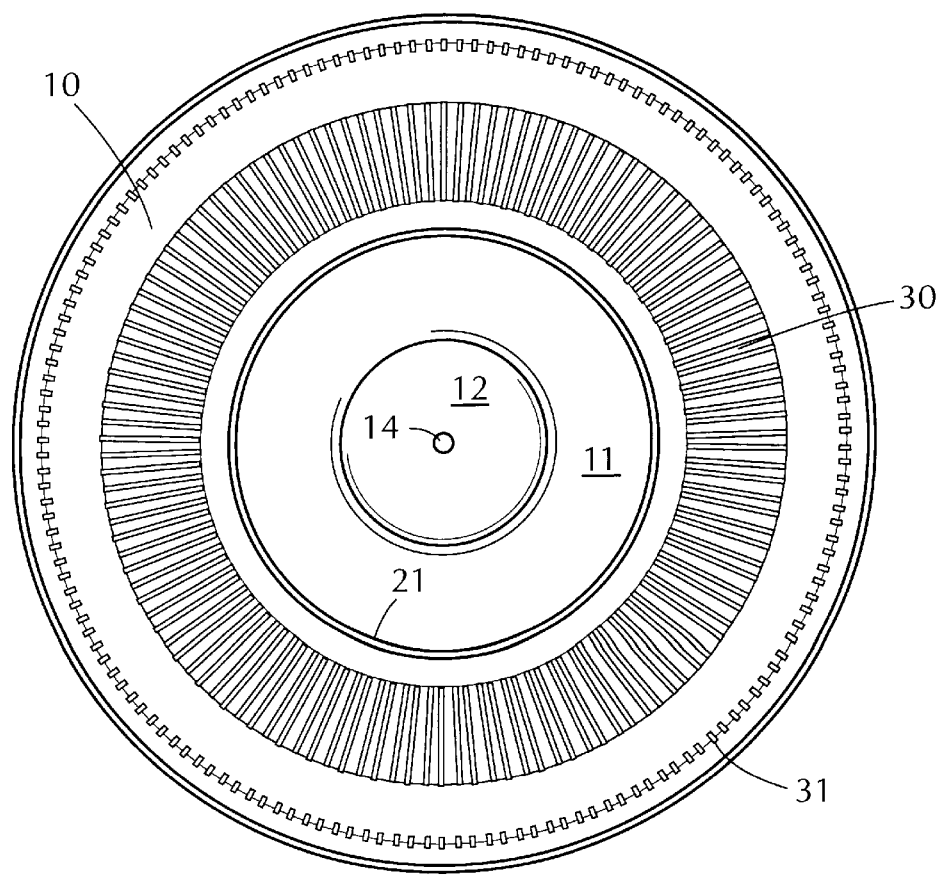
FIG. 2 is a bottom elevational view of the bowl of the invention.
Figure 3:
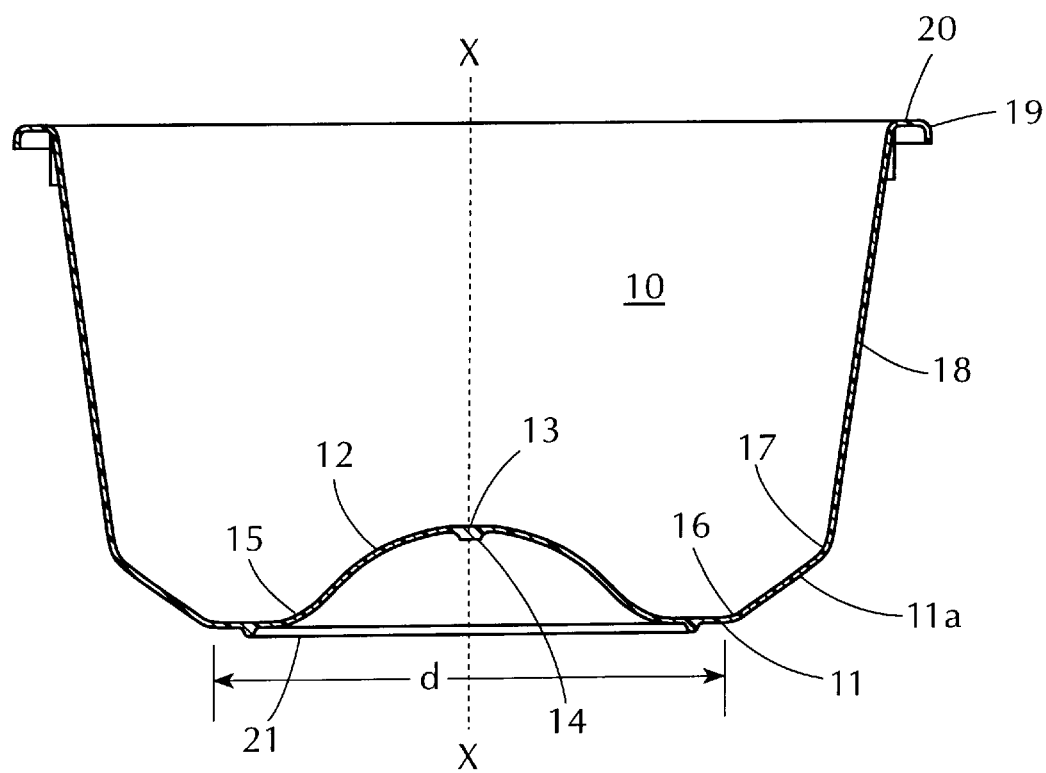
FIG. 3 is a section view of the bowl of the invention.

A preferred embodiment of a container of the invention in the form of a bowl 10 is illustrated in FIGS. 1–3. Bowl 10 is comprised of a generally circular bottom portion which comprises a push-up 12 having an apex 13 on the central axis X—X of the bowl. (Sprue 14 may be left at the apex 13 on the underside of the pushup 12 if the bowl is manufactured using an injection molding process.)

Push-up 12 comprises a section of a sphere. The push-up increases the surface area of the bowl adjacent to the contained food so that the probability of microwaves entering the bowl and heating the food is increased. Bottom panel 11 extends to push-up 12 along first bottom radius 15 which is smooth and without sharp edges because sharp edges within the bowl can cause uneven cooking and they can contribute to boiling over by providing additional nucleation points. Smooth radii, in contrast to sharp edges, facilitate the convective movement of liquid as it heats. Bottom panel 11 also extends along second and third bottom radii 16 and 17, having a substantially frusto-conical portion 11a therebetween, said frusto-conical portion having a smooth surface on the inside of the bowl and a plurality of lower ribs 30 radially disposed on the outside of the bowl. Lower ribs 30 can extend beyond frusto-conical portion 11a as illustrated in FIG. 1 wherein they extend over the exterior of radii 16 and 17. The smooth inside surface of frusto-conical portion 11a and radii 16 and 17 are without sharp edges for the same reasons as explained above. Lower ribs 30 provide an area on the outside of the bowl which can be handled when the bowl is hot with reduced transfer of heat to the consumer's hands.

Portion 11a extends along radius 17 to side panel 18 and side panel 18 tapers outwardly away from axis X—X, as it extends from the bottom portion toward an end opening defined by rim 19. The taper of the side panel has a sufficient slope to release the steam which will be convected up the inside walls during cooking. The outer segment of the bottom portion also has a doughnut-like shape which assists in this convection by having a lower temperature than the area about the push-up. The shape of the bottom of the bowl also provides an area in which dry ingredients can collect. With the addition of water, the ingredients rehydrate in a concentrated area and rehydrate faster.

Figure 4:
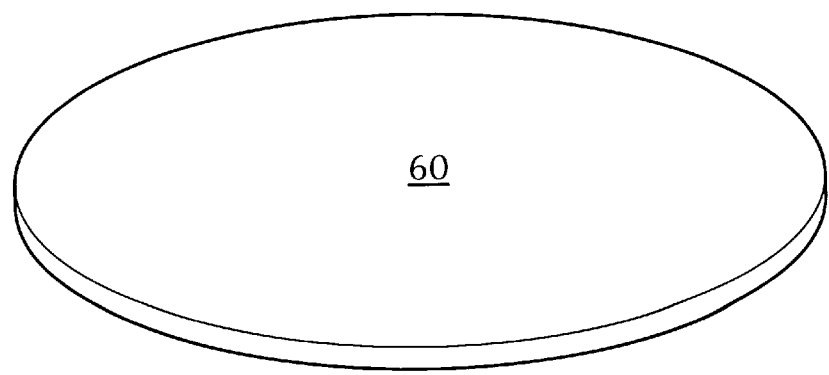
FIG. 4 is a perspective view of a lid for the bowl.

Rim 19 has a flat portion 20 which substantially lies in a plane normal to axis X—X and which facilitates sealing a lid 60 (FIG. 4) on top of the bowl 10. Conventional lid materials and sealing adhesives can be employed as will be apparent to those skilled in the art. The rim 19 has a rolled outer edge to provide strength so that the consumer can lift the bowl 10 using the rim, particularly after cooking when the bowl may become more flexible due to heating. Upper ribs 31 are radially disposed on the exterior of the side panel of the bowl and extend downwardly from rim 19 to provide an area on the exterior of the bowl which can be handled when the bowl is hot with reduced transfer of heat to the consumer's hand. The upper ribs 31 are sufficiently spaced from lower ribs 30 to provide an area 32 for labeling.

Optional bottom rib 21 is disposed on the underside of bottom panel 11 to raise bowl 10 slightly off the shelf 47 of the microwave oven 40, thereby reducing the transfer of heat from the bowl to the shelf by providing air insulation.

Figure 6:
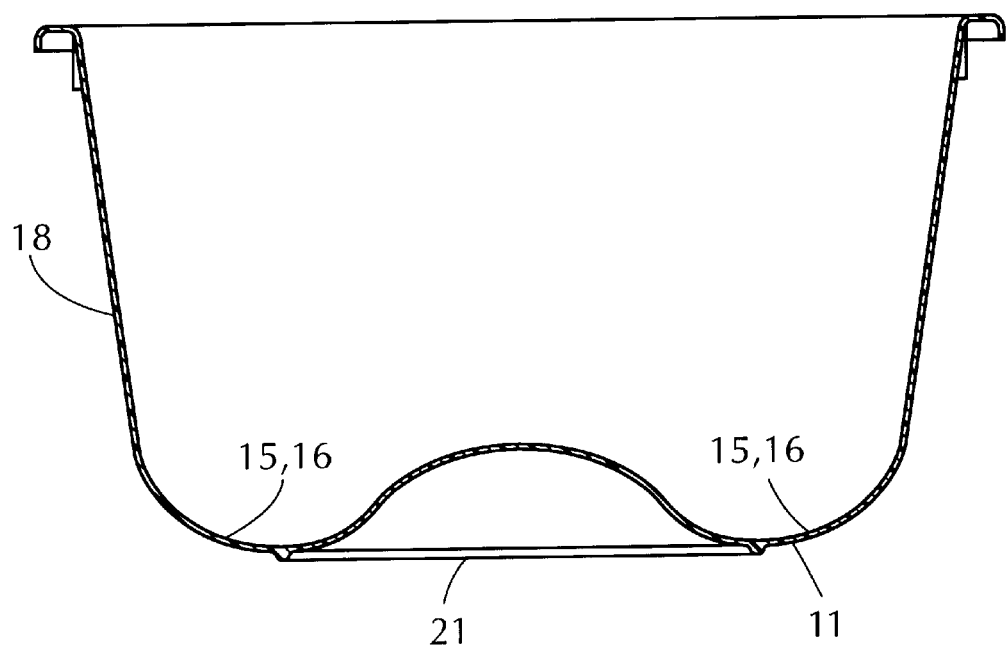
FIG. 6 is a section view of a bowl of the invention having a curved bottom panel.

FIG. 6 illustrates an embodiment of the invention having a curved bottom panel 11. In this embodiment, radii 15, 16 can be the same or different and when they are different the curve can be in the shape of an ellipse. Other than the shape of the bottom, this embodiment can have all of the features of the aforesaid embodiment. For example, lower ribs can be radially disposed on a portion of the exterior of the bottom panel extending downwardly from the side panel toward a low point (i.e., the perigee or point of contact) of the bottom panel.

In microwave ovens, energy enters into an oven cavity through a feed slot. The slot can be on the top, bottom or side, and energy is reflected off the walls and bottom of the oven and into the product being heated. When a conventional bowl is placed in a microwave oven, a minimum amount of energy is reflected from the bottom of the oven into the bowl because the bowl bottom is relatively small in area and the top of the shelf is only raised off the bottom by a short distance.

According to the present invention, the spherical section (push-up 12) increases the overall exposed area of the bottom portion of the bowl, providing greater area for microwave energy to enter the bottom of the bowl. Push-up 12 also reduces the thickness of the product to be heated in the center.

The geometry of the bowl causes the portion of the contents which fill the section below a plane normal to axis X—X and intersecting push-up 12 at apex 13 (plane Y—Y in FIG. 5) to be cooler than the contents above the push-up 12 and thereby promotes convective rotation of the liquid-containing contents. The slanted walls of the bowl and the section in the bottom of the bowl, below plane Y—Y, permit the dissipation of the pressure that builds up from boiling, which is created by the amount of energy induced into the bowl. With a wider top diameter than the bottom, the less vigorously the product will boil and this helps to avoid bumping. (Bumping is a build up of pressure in a region of a liquid that becomes superheated and then suddenly erupts causing the container to jump and produce a thumping or bumping sound. Vertical bowl or cup walls hinder convection, prevent the gradual release of pressure and cause more frequent bumping.)

Figure 5:
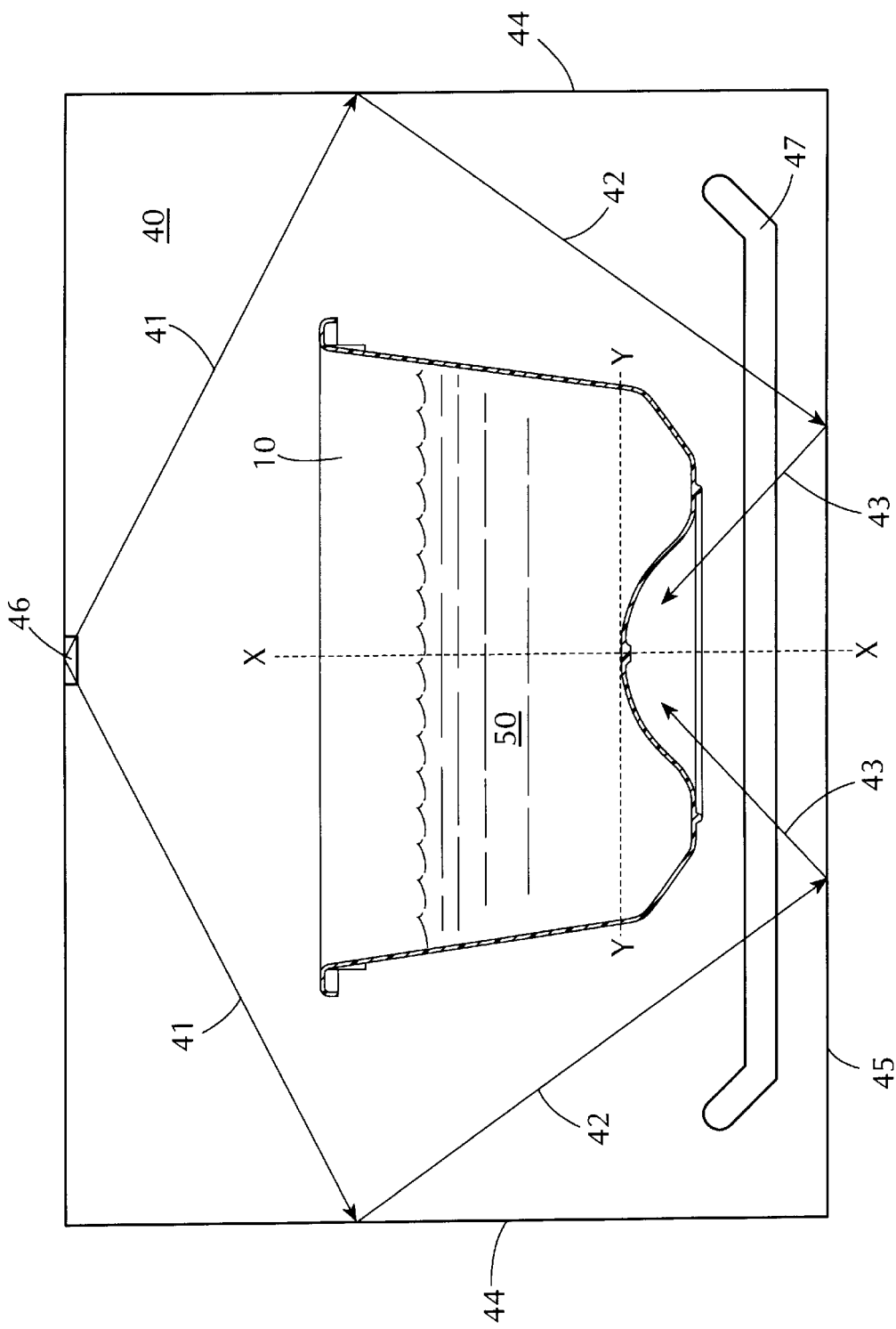
FIG. 5 is a section/schematic view illustrating the bowl of the invention in a microwave oven.

FIG. 5 illustrates a microwave oven having a feed slot at the top and shows how microwave energy can be directed into and through the bottom of the cooking container. When bowl 10 is placed on shelf 47 in microwave oven 40 to cook the contents 50, microwave energy enters the oven from feed slot 46 and some of the energy is emitted in the direction of arrows 41. This energy is reflected off walls 44 in the direction of arrows 42 and is again reflected off bottom 45 in the direction of arrows 43. Accordingly, energy is ultimately directed into and through the spherical section of pushup 12 to heat contents 50. When contents 50 are sufficiently heated, the geometry of the bowl causes controlled boiling to occur without boil over. The controlled boil is achieved by the uniform distribution of heat, the lack of sharp corners within the bowl and the tapered sides 18. Bumping is accordingly avoided and the risk of boil over is minimized.

Geometrically, when viewed from the bottom, the bowl of the invention has a torus (doughnut) shape. The effective circumference of the torus should be greater than a whole number of half wavelengths in order to avoid or minimize the occurrence of so called ring-resonance. Accordingly, in conventional microwave ovens which operate at a frequency of about 2,450 megahertz (MHz), the resonance lengths to be avoided in terms of effective diameter of the torus are about 60, 120 and 180 mm. (Since there is some wave penetration into a dielectric, its "microwave diameter" becomes slightly less than its geometrical diameter.) The effective diameter of the torus, therefore, must be large enough to have an antiresonant effect. For conventional microwave ovens, the effective diameter must be greater than 60 mm, preferably greater than about 65 mm, so that the effective circumference of the torus (at the effective diameter) becomes antiresonant. (If a microwave oven operated at a frequency different from about 2,450 MHz, the effective diameter would be adjusted accordingly, as would be apparent to one skilled in the art.) As a practical matter, for efficient microwave heating, the effective diameter of the torus also should be less than about 100 mm.

A torus has a centerline diameter and a body diameter. For definitional purposes in the present specification, the effective diameter is measured at the outer line of contact of the bowl with the shelf of the microwave oven when the contents of the bowl include a substantial amount of water. (Effective diameter is measured at this line when the contents of the bowl are products containing liquid as defined herein and this is based on the dielectrics of the water, a load with a high dielectric constant. As the load becomes dryer, the effective diameter is measured at a higher line (away from the bottom panel and toward the end opening) defined by a plane normal to the X-axis which intersects the outer diameter of the torus. Accordingly, for a semi-dry load (i.e., a lower dielectric constant load) the effective diameter could be measured at the average radius of curvature.) When an optional bottom rib 21 is disposed on the underside of bottom panel 11, however, the rib is not considered as defining the line of contact for purposes of measuring the effective diameter. Accordingly, the effective diameter is measured at the place where the outer line of contact would be in the absence of bottom rib 21.

The effective diameter of the torus of the bowl of the present invention is the distance d illustrated in FIG. 3 for products containing liquid. The bowl of the invention accordingly has a torus with an effective diameter sufficiently large to have an antiresonant effect. In the preferred embodiment of the invention, the diameter of the torus is more than 60 mm, preferably more than about 65 mm, and less than about 100 mm.

The bowl can be manufactured using any food grade materials which can withstand at least the temperature of boiling water or the contents of the container. Various polymers and polymer blends are suitable and they can include polyethylene terephthalate, polycarbonate, polyacrylonitrite, nylons, glass, polypropylene and polyethylene. A preferred material used to make the bowl is polypropylene and this can have high density polyethylene mixed therein to increase resistance to impact breakage at low temperatures.

EXAMPLE

A disposable bowl was made by injection molding a blend of polypropylene and high density polyethylene. The inside diameter at the end opening was 110 mm and the inside diameter at the bottom of the side panel (where the side panel 18 meets radius 17 in FIG. 3) in a plane normal to the central axis was 95 mm. The diameter of the torus was 65 mm. The interior height of the bowl from the bottom panel to the end opening was 75 mm. The push-up had an outside diameter (i.e., inside the bowl) of 45 mm and a height from the lowest point inside the bottom of the bowl of 10 mm. The bowl was filled with liquid to a fill line located 25 mm below the end opening and subjected to microwave heating. The liquid boiled vigorously without boiling over.

What is claimed is:

1. A container for use in microwave cooking in an oven operating at a microwave wavelength, said container having a bottom portion essentially defining a torus in bottom plan view, said torus having an effective circumference greater than a whole number of half wavelengths and an effective diameter, measured according to the dielectric constants of the contents of said container, sufficiently large to have an antiresonant effect, a side panel extending from said bottom portion and a cover receiving lip structure extending about and defining an end opening opposite the bottom portion, said side panel extending about a central axis through the bottom portion and end opening and comprising:

said bottom portion having a central segment and an outer segment, a substantially spherical section defining the central segment and having an apex on the central axis, the apex being disposed toward the end opening; said substantially spherical section having a substantially circular base intersecting a plane extending normal to the central axis, the outer segment having a base portion extending downward from said substantially circular base and away from the end opening along a first bottom radius and in a direction away from the central axis to a bottom panel, said bottom panel being substantially circular and extending away from the central axis along a plane extending substantially normal to the central axis to a second bottom radius and then extending upwardly along said second bottom radius away from said bottom portion and toward the end opening to the side panel;

said side panel having an exterior and having a continuous inner wall face intersecting a plane extending normal to the central axis along a substantially circular line and having a larger radius at the end opening than at the bottom portion whereby the inner wall face is tapered away from the central axis as the side panel extends upwardly from the bottom portion toward the end opening, said inner wall face having a sufficient slope to permit the gradual dissipation of pressure built up from boiling the contents of said container to reduce the frequency of bumping.

2. The container of claim 1 wherein the outer segment further comprises a frusto-conical portion disposed between the second bottom radius and the side panel, said second bottom radius extending to the frusto-conical portion and said frusto-conical portion extending upwardly and tapering away from the central axis to a third bottom radius, the third bottom radius extending upwardly to the side panel.

3. The container of claim 2 having lower ribs radially disposed on the exterior of the frusto-conical portion.

4. The container of claim 3 wherein said lower ribs extend along the exterior of the third bottom radius.

5. The container of claim 4 wherein said lower ribs extend along the exterior of the second bottom radius.

6. The container of claim 6 having upper ribs radially disposed on the exterior of the side panel and extending downwardly from the cover receiving lip structure along a portion of said exterior.

7. The container of claim 6 wherein a smooth labeling surface is defined on the exterior of the side panel by the space between the upper ribs and the lower ribs.

8. The container of claim 1 further comprising a bottom rib disposed on the exterior of said bottom panel, said bottom rib extending away from the end opening.

9. The container of claim 1 wherein the cover receiving lip structure is comprised of a substantially circular flange extending from the side panel away from the central axis in a plane normal to the central axis and further extending along a radius downwardly from the end opening to define a rolled outer edge.

10. The container of claim 1 having lower ribs radially disposed on the exterior of the outer segment.

11. The container of claim 1 having upper ribs radially disposed on the exterior of the side panel and extending downwardly from the cover receiving lip structure along a portion of said exterior.

12. The container of claim 1 having a curved bottom panel wherein the first bottom radius and the second bottom radius are the same or different.

13. The container of claim 12 having lower ribs radially disposed on a portion of the exterior of the curved bottom panel, extending downwardly from side panel toward a low point of the curved bottom.

14. The container of claim 13 having upper ribs radially disposed on the exterior of the side panel and extending downwardly from the cover receiving lip structure along a portion of said exterior.

15. The container of claim 12 having upper ribs radially disposed on the exterior of the side panel and extending downwardly from the cover receiving lip structure along a portion of said exterior.

16. The container of claim 1 wherein said torus has an effective diameter greater than 60 mm and less than about 100 mm.

* * * * *